Patented May 29, 1934

1,960,617

UNITED STATES PATENT OFFICE 1,960,617

PROCESS OF REMOVING WAX FROM PETROLEUM OILS

Harry T. Bennett, Tulsa, Okla., assignor to Mid-Continent Petroleum Corporation, Tulsa, Okla., a corporation of Delaware No Drawing. Application August 31, 1931, Serial No. 560,493

6 Claims. (Cl. 196—18)

This invention relates to a process of removing wax from petroleum oil so that the oil will flow at relatively low temperatures.

One of the objects of this invention is to provide a simple and inexpensive method whereby the wax may be easily and efficiently removed from the oil.

Prior to this invention wax-containing petroleum oils have been chilled and then filtered to remove the wax. Various filter aids have been added to the oil to prevent the clogging of the filter. These old filter aids, however, have either been so expensive as to prohibit or limit their use, or they have not prevented the clogging of the filter.

Another object of this invention, therefore, is to provide an inexpensive filter aid which will effectively prevent the wax from clogging the filter.

As an illustration of one method of accomplishing the foregoing objects, an approved method of carrying out this invention is set forth in detail in the following description, but it is to be understood that this specific disclosure does not set forth all of the several ways in which the invention may be used, and that various modifications conforming to the invention will be obvious to those skilled in this art.

Briefly stated, the invention comprises the step of mixing grain hulls with a wax-containing oil, and then filtering the resultant mixture to separate the oil from the wax and grain hulls.

The preferred form of the invention includes the steps of adding a diluent, such as naphtha, to the oil to be treated, chilling the diluted oil, thereafter adding grain hulls to the chilled oil, and filtering the resultant mixture to separate the oil and diluent from the congealed wax and grain hulls.

As an illustrative example of one specific method of carrying out this invention, I will show how I have treated a wax distillate obtained from Mid-Continent crude. This distillate had the following properties:

| | |
|---|---|
| Gravity A. P. I. | 23.1 |
| Flash | 480° F. |
| Fire | 560° F. |
| Saybolt vis. at 210° F. | 70 |
| Cold test | 88° F. |

This lubricating oil distillate was diluted by adding 40 parts by volume of the distillate to 60 parts by volume of naphtha of 55 A. P. I. gravity. The mixture of diluent and wax distillate was then chilled to 5° F. while agitating the mixture to prevent wax from settling out. Ground rice hulls of about 200 mesh, at the rate of one pound to one gallon of the wax distillate, were then stirred into the chilled mixture of diluent and wax distillate. This mixture was filtered by a vacuum filter press wherein the lubricating oil stock and diluent were separated from the congealed wax and filter aid which remained in the filter press.

The diluent was separated from the lubricating stock by distillation. The lubricating oil thus obtained had a cold test of 20° F.

In the foregoing process I have found that by adding the ground rice hulls after the chilling operation, the wax will not adhere to the rice hulls to prevent their function as a filter aid. Instead of clinging to each other, or to the wax, the rice hulls form a porous mat on the surface of the filter to receive the wax and exclude it from the surface or interior of the filter.

In the illustrative example of separating the wax from the oil, I have referred to a dilution of the oil with 60 parts of diluent to 40 parts of oil. However, it is understood that the invention is not limited to such details, as the diluent may be omitted or any suitable quantities thereof, such as 40 to 75 parts of diluent to 60 to 25 parts oil, may be used without departing from the spirit of this invention.

After the rice hulls have been used as a filter aid they may be reused for the same purpose by separating the wax from the hulls.

As an illustration of one method of separating the wax from the hulls, I will show how the separation can be very easily accomplished with the aid of a solvent, such as warm naphtha which may be at a temperature of approximately 120° F. to 160° F. The mixture of wax and hulls is preferably agitated with the warm naphtha until the wax is dissolved. The hulls may then be recovered by filtering the resultant mixture through a filter press or by any other suitable method.

I claim:

1. The process of dewaxing oils which comprises diluting the oil to be treated, chilling the diluted oil, adding ground grain hulls to the chilled mixture, agitating the resultant mixture, filtering the resultant mixture to separate the oil and diluent from the congealed wax and grain hulls, separating the diluent from the oil, and removing the grain hulls from the wax.

2. The process of removing wax from petroleum oil which comprises diluting the oil to be treated, chilling the diluted oil, adding ground rice hulls to the chilled mixture, filtering the resultant mixture to separate the oil and diluent from congealed wax and ground rice hulls, and separating the diluent from said oil.

3. The process of removing wax from petroleum oil which comprises diluting the oil to be treated, chilling and agitating the diluted oil, adding rice hulls of about 200 mesh to the chilled mixture at the rate of one pound of hulls to approximately one gallon of the original oil, stirring the resultant mixture, filtering the mixture to separate the oil and diluent from the congealed wax and rice hulls, and distilling the oil and diluent to separate the diluent from the oil.

4. The process of removing wax from petroleum oil which comprises diluting the oil with a quantity of naphtha amounting to approximately 60% of the volume of resultant mixture, chilling the diluted oil to approximately 5° F., agitating the diluted oil during the chilling operation, adding ground rice hulls to the chilled mixture at the rate of one pound of hulls to approximately one gallon of the original oil, filtering the resultant mixture to separate the oil and diluent from the congealed wax and rice hulls, and distilling the oil and diluent to separate the diluent from the oil.

5. The process of removing wax from petroleum oil which comprises diluting the oil with a quantity of naphtha amounting to approximately 60% of the volume of resultant mixture, chilling the diluted oil to approximately 5° F., adding ground rice hulls of approximately 200 mesh to the chilled mixture at the rate of one pound of hulls to approximately one gallon of chilled oil, stirring the resultant mixture, filtering the mixture under a vacuum to separate the oil and diluent from the congealed wax and rice hulls, and distilling the oil and diluent to separate the diluent from the oil.

6. The process which comprises diluting a wax-containing oil with a quantity of naphtha amounting to approximately 60% of the volume of resultant mixture, chilling the diluted oil to approximately 5° F., adding ground rice hulls of approximately 200 mesh to the chilled mixture at the rate of one pound of hulls to approximately one gallon of chilled oil, stirring the resultant mixture, filtering the mixture under a vacuum to separate the oil and diluent from the congealed wax and rice hulls, distilling the oil and diluent to separate the diluent from the oil, adding naphtha of approximately 120° F. to 160° F. to the mixture of wax and rice hulls, agitating the resultant mixture until the wax is dissolved, and filtering said last mentioned mixture to separate the rice hulls from the naphtha and wax.

HARRY T. BENNETT.